United States Patent Office 3,407,314
Patented Oct. 22, 1968

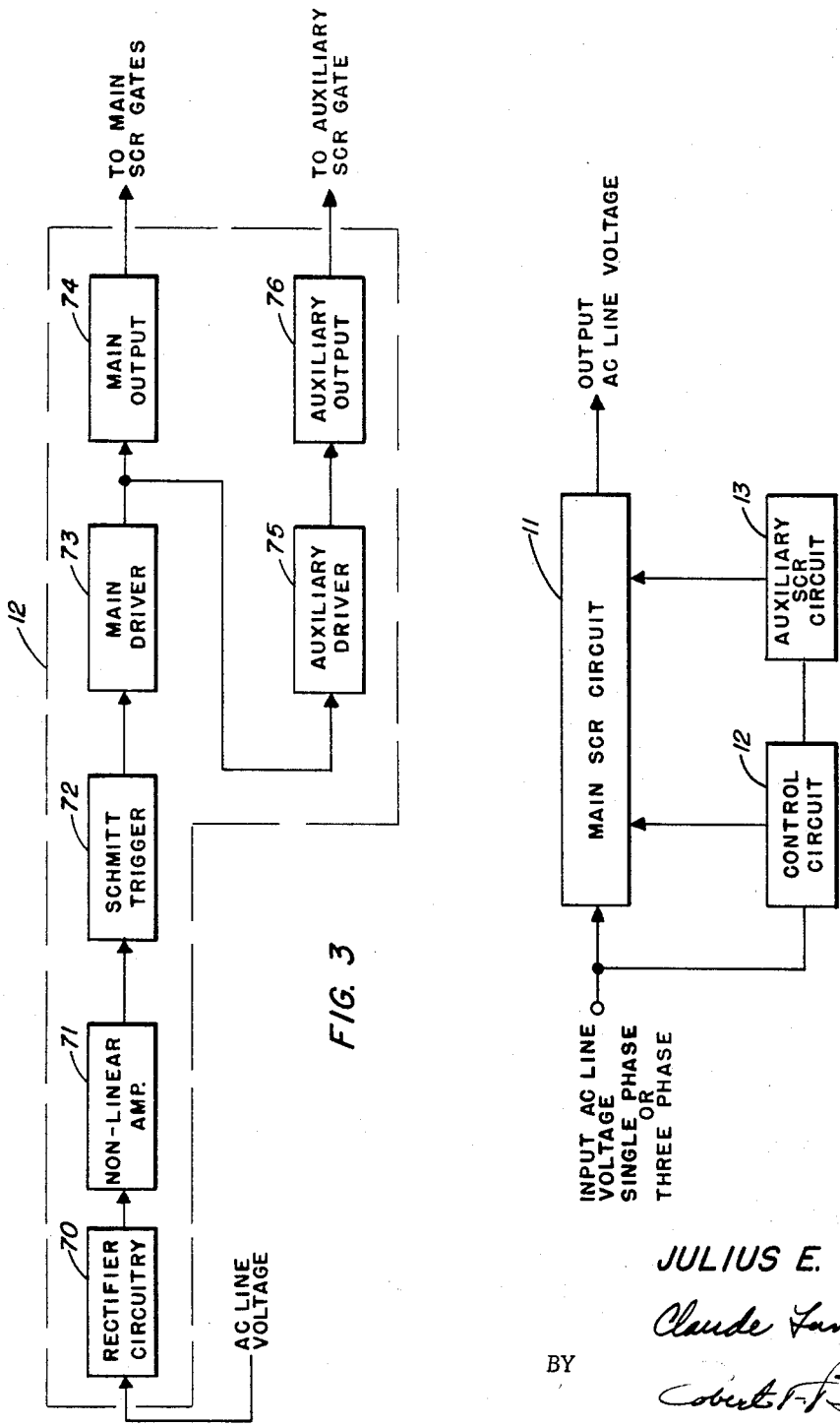

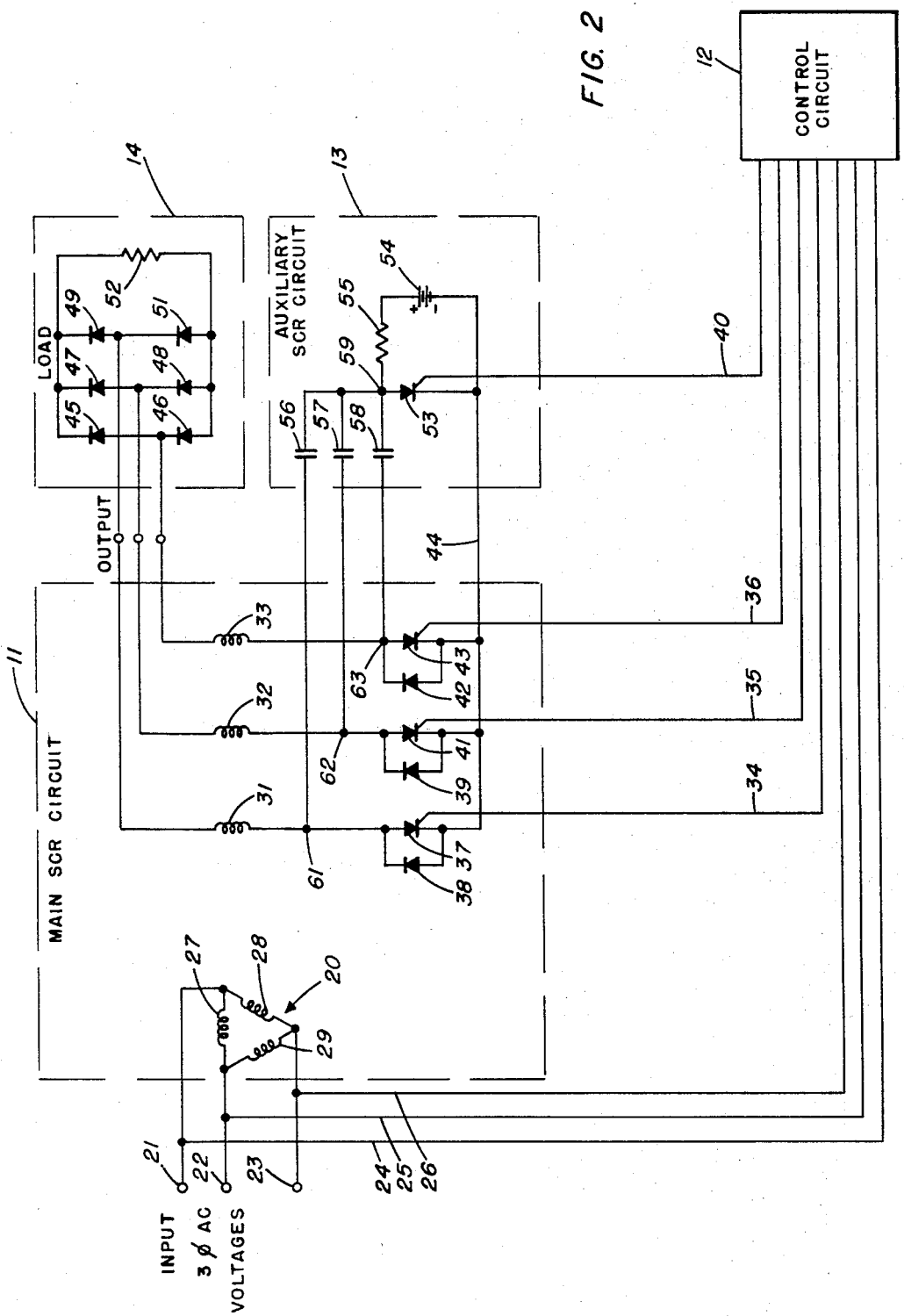

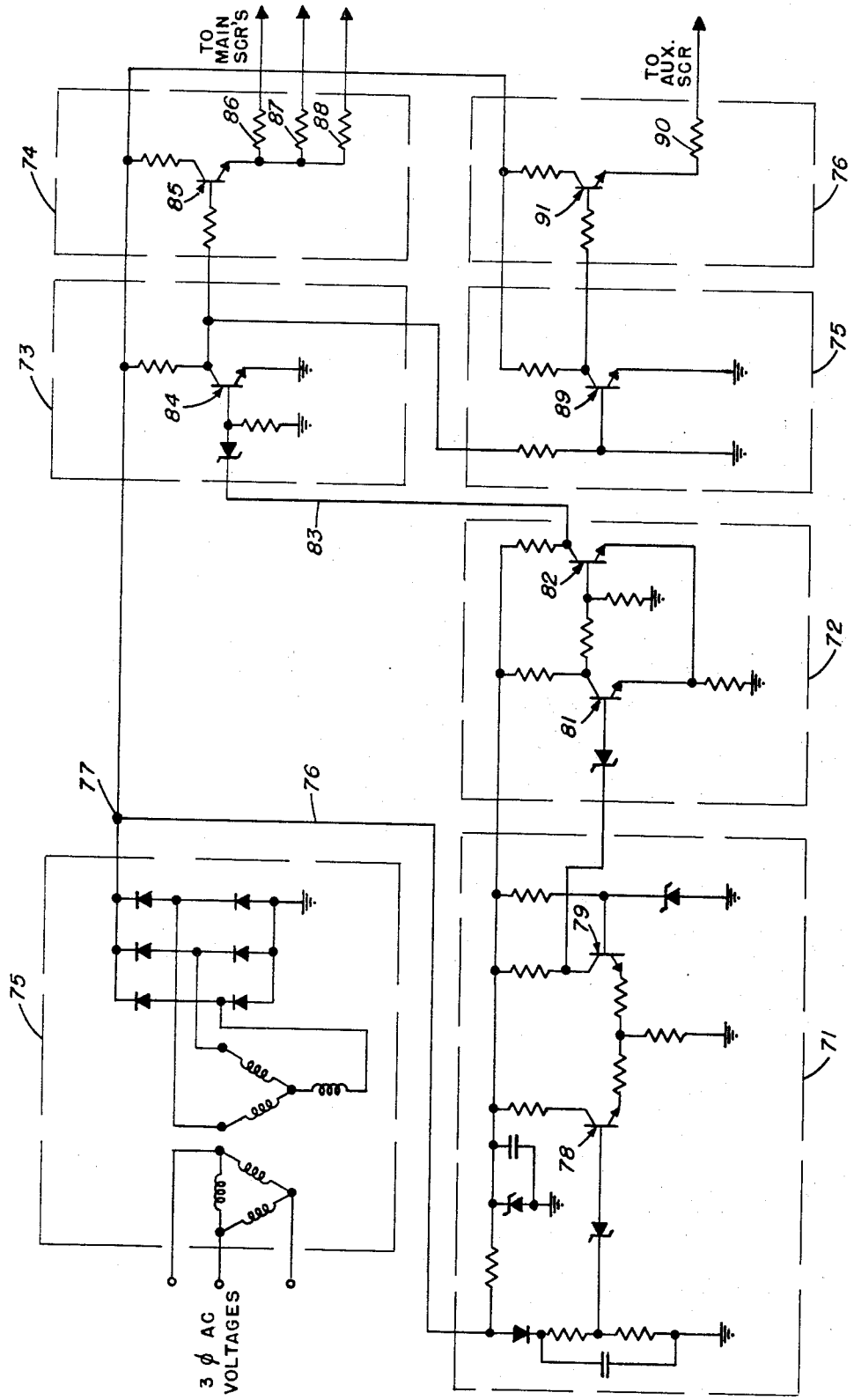

3,407,314
TRANSIENT PROTECTION
Julius E. Wolff, Baltimore, Md., assignor, by mesne assignments, to the United States of America as represented by the Secretary of the Navy
Filed Mar. 17, 1965, Ser. No. 440,650
7 Claims. (Cl. 307—297)

ABSTRACT OF THE DISCLOSURE

An electronic voltage regulator circuit for protecting components from damage due to line surges. A silicon, controlled rectifier is placed in the line in series with the load and should the line voltage go above a predetermined level, the rectifier blocks current going to the load. An auxiliary rectifier circuit also operates at the same time to insure that the main rectifier cuts off completely and promptly.

---

This invention relates to electronic voltage regulator circuitry and more particularly to semiconductor circuitry for protecting electronic components of regulated power supplies and the components of auxiliary apparatus from destruction due to line transient voltages.

Many types of auxiliary electronic circuitry apparatus require a constant output direct current voltage regulated against variations in input voltages. Conventional regulated power supplies, in numerous applications, usually employ transistorized circuitry for controlling the voltage output of the power supply above and below the nominal output voltage. Usually, the transistorized circuitry varies in conductivity as the output voltage varies and this characteristic is used to restore the power supply output voltage to its nominal value. A distinct disadvantage in this type of regulated power supply apparatus is that the power requirements of the controlled transistorized circuitry may be exceeded by line transients generated in the power auxiliary source. In many cases, the regulated power supply and electronic components must be able to withstand line transients of a few seconds' duration with peak magnitudes substantially above normal operating voltages. Therefore, it is necessary to provide protective devices either in or before power supply circuitry or auxiliary electronic components, particularly those using semiconductors, which can faithfully withstand any line transient voltage magnitudes which may occur.

The use of conventional overload devices such as fuses and circuit breakers have been wholly unsatisfactory as protective devices for transistorized electronic equipment which needs fast-acting or short-time constant circuit-breaking action to prevent damage to the transistorized circuitry elements from overloads. The most common of the conventional overload devices is the fuse and the circuit breaker. The most frequently used of these two is the fuse. The fuse is an expendable device which is connected between the generating source and the load and opens or disconnects the power supply circuit from the power source whenever the current through the power supply circuit becomes excessive. It consists principally of a section of fusable element of such properties and physical proportions that excessive current flow through the element melts it and thereby severs the circuit. The time required to melt the element depends upon the value of current flow and also depends upon the size, shape and material of the fusable element. At best, the fuse is a slow-acting device which as been found totally inadequate for circuitry systems which require fast-acting and reliable opening of the power source circuit upon short-time power overloads through the system. The circuit breaker on the other hand is a mechanical device which opens an electric circuit whenever excessive current flows through the circuit. The circuit breaker is a much faster device in opening the circuit, over the fuse, but it is still considered slow-acting for the required protection against line transients. Further, the circuit breaker, by its inherent characteristics, requires a device which is usually bulky, mechanically complex and expensive.

The transient limiting circuitry disclosed may be used in power feed lines of either three phase or single phase that are used as a supply source to a single power supply or to a system of power supplies. This technique and circuitry allows the utilization of a common means of limiting transients to all power supplies in which line transients are a problem.

The transient overshoot voltage is blocked in each phase of the three phase line between the input generator and the power supply. Control circuitry is used to detect the magnitude of the line voltage present at the output of the three phase generator and this information is used for applying control signals to the suppression circuitry in the three phase feeder lines.

When the alternating current line voltage exceeds a predetermined value, the control circuitry cuts off or blocks the current through the three phase lines. At the same time, the control circuitry operates an auxiliary circuit that aids in causing immediate cut-off of the current through the leads feeding the power supplies.

Thus, the instant transient limiting circuitry provides a completely electronic suppressing means that provides protection for either a single regulated power supply or a system of regulated power supplies from line transient voltages which may be generated in the power generating circuit and gives immediate automatic protection.

An object of the present invention is to provide an improved transient limiting circuitry arrangement for protecting power supplies and electronic load components from line transients.

Another object of the present invention is to provide a completely electronic apparatus for the suppression of line source transients.

A further object of the present invention is to provide a completely electronic apparatus for opening all three lines of a three phase system during over-voltage transients.

Still another object of the present invention is the provision of an electronic circuitry apparatus configuration that is dependable, reliable and inexpensive.

Another object of the present invention is the provision of electronic circuitry apparatus that effectively suppresses line transients to a safe level.

A further object of the present invention is the provision of protective circuitry apparatus that permits the use of semiconductor elements in a system of power supplies.

Another object of the present invention is the provision of electronic circuitry which may be used with conventional regulated power supply circuits to provide them with protection against generating voltage source transients.

Still another object of the present invention is the provision of a protective circuitry arrangement that provides instant and automatic protection against line transients.

A further object of the present invention is the provision of a transient limiting circuitry that is used in a three phase system of power for providing protection from line transients to a plurality of power supplies connected to this system of power.

A further object of the present invention is the provision of a method for protecting a system of regulated power supplies from line transients.

Other objects, advantages and novel features of the invention will become apparent from the following detailed description of the invention when considered in conjunction with the accompanying drawings wherein:

FIG. 1 is a block diagram of the invention.

FIG. 2 is a schematic circuit diagram of the invention.

FIG. 3 is a block diagram of the components of the control circuitry.

FIG. 4 is a schematic diagram of the control circuitry components.

With reference to FIG. 1, there is shown a block diagram of the overall operational system. An AC line voltage of either three phase or single phase is fed to the main silicon controlled rectifier circuit block 11. Also electrically connected to the AC line voltage is the control circuit block 12. The control circuit block 12 has two outputs; one output electrically connected to block 11 and the other output is fed to the auxiliary silicon controlled rectifier circuit 13. An output is taken from block 13 and electrically coupled to block 11. The main silicon controlled rectifier circuit either passes or blocks the AC line voltage depending upon a predetermined value of the line voltage. The control circuit 12 and the auxiliary circuit 13 provide control signals, upon the AC line voltage exceeding the predetermined value, to either turn block 11 on or cut block 11 off. This action blocks the AC line output voltage from the load until such time as the input line voltage drops below a predetermined level.

FIG. 2 shows a detailed electrical schematic of the electrical components contained in the respective functional blocks of FIG. 1, except for the control circuit block 12 which will be more fully explained and shown in FIG. 4 later in the specification. The main silicon controlled rectifier circuit 11 has a three-phase transformer, shown generally as numeral 20, having primary windings 27, 28 and 29 connected in a delta configuration. These respective windings are connected to the input AC line by feed lines 21, 22 and 23, respectively; the feed lines are connected to a three phase generator voltage supply source, not shown. Also connected to lines 21, 22 and 23, respectively, are control voltage feed lines 24, 25 and 26, respectively. These respective lines are connected to the input of control circuit block 12.

The secondary windings of the transformer 20 are designated as windings 31, 32 and 33, respectively. Each of these windings is connected on one side to a network consisting of a silicon controlled rectifier and a diode. An output voltage from control circuit 12 is electrically coupled by means of line 34 to the electrode of silicon controlled rectifier 37. The anode of silicon controlled rectifier is coupled electrically to winding 31 via junction 61. The cathode of silicon controlled rectifier 37 is coupled to common line 44. Paralleled across silicon controlled rectifier 37 is a diode 38 having its cathode electrically connected to the anode of the silicon controlled rectifier 37 and its anode connected to the cathode side of silicon controlled rectifier 37. An output from the controlled circuit 12 is connected by means of line 35 to the electrode of silicon controlled rectifier 41. The anode of silicon controlled rectifier 41 is coupled to one side of winding 32 via junction 62. A diode 39 is coupled in parallel circuitry arrangement with silicon controlled rectifier 41; the cathode of diode 39 being coupled to the anode of silicon controlled rectifier 41 and the anode of diode 39 being coupled to the cathode of silicon controlled rectifier 41.

The cathode side of the silicon controlled rectifier 70 is coupled to common line 44. The third control voltage from control circuit 12 is coupled in like manner to a network of a silicon controlled rectifier and diode by means of electrical lead 36 connected to the electrode of silicon controlled rectifier 43. Winding 33 is coupled to silicon controlled rectifier 43 at its anode terminal via junction 63. The cathode of the silicon controlled rectifier 43 is coupled to common line 44. Coupled in parallel circuit arrangement to the anode of silicon controlled rectifier 43 is the cathode of diode 42; the anode of diode 42 being coupled to the cathode of silicon controlled rectifier 43. An additional control voltage is coupled from control circuit 12 to the silicon controlled rectifier 53 in block 13 by means of electrical lead 40. The silicon controlled rectifier is coupled at its cathode side to the common line 44 and at its anode side to junction 59. A series circuit consisting of battery 54 and current limiting resistor 55 are connected in parallel circuitry arrangement with the silicon controlled rectifier 53 by connection of one side of the resistor 55 to junction 59 and connection of the negative terminal of the battery to common line 44. The anode of silicon controlled rectifier 53 is electrically coupled to each of the respective lines at junctions 61, 62 and 63, respectively, via capacitors 56, 57 and 58, respectively; one side of each of the capacitors being connected to junction 59 and the other side being connected to the respective phases of the three phase line. The output taken from main silicon controlled circuit 11 is coupled to a load block designated at 14 via electrical leads, not numbered. Each lead conducting a phase on the three phase voltage is connected to a diode rectifier network; the secondary winding 31 being shown as connected between the anode and cathode of series connected diodes 49 and 51, respectively, the other electrodes of these respective diodes being electrically connected across load resistance 52. Paralleled with the diode network and connected to secondary windings 32 and 33 are series diode networks made up of diode 47 and diode 48, and diodes 45 and 46, respectively. These networks are connected to windings 32 and 33 and restrictor 52 in like manner as winding 31.

The internal components of control circuit 12 are best shown by means of reference to FIG. 3 which shows the respective components broken down into functional block circuits and also with reference to FIG. 4 which shows the electrical component circuitry within these respective blocks. As illustrated in FIG. 3, functional block 12 is made up of a number of internal component blocks. Block 70 represents rectifier circuitry that is coupled to the AC line voltage. An output is fed to non-linear amplifier circuit 71. The output taken from the non-linear amplifier 71 is electrically coupled to a Schmitt trigger circuit 72 and the output from the Schmitt trigger is electrically coupled to a main driver circuit 73. The output from main driver circuit 73 is electrically coupled to the input of main output circuit 74 and also is electrically coupled to auxiliary driver circuitry 75; this circuitry having its output coupled to the input of auxiliary output circuit 76. An electrical output from the auxiliary output circuit 76 is coupled to the auxiliary silicon controlled rectifier circuit 13. The output from the main output circuitry 74 is coupled to the electrodes of the respective silicon controlled rectifiers in block 11, best shown in FIG. 2.

Referring now to FIG. 4, the three phase line voltage is coupled to rectifier circuitry shown in block 70. This rectifier circuitry is of conventional design and is not further explained. The DC output from block 70 is coupled to junction 77. Coupled to junction 77 by means of electrical lead 76 is the output voltage from rectifier 70. The input circuit of 71 consists of a diode resistance-capacitance network coupled to ground. Functional block 71 is a conventional non-linear amplifier circuit which is made up of two circuit stages; comprising transistor 78 and transistor 79. An output is taken from the collector of transistor 79 and coupled to Schmitt trigger circuit 72. The circuitry of 72 is a conventional Schmitt trigger circuitry and, as shown, is made up of transistor circuits 81 and 82, respectively. An output is taken from the collector of the transistor in circuitry 82 and coupled to a main driver circuitry 73 via electrical lead 83. The main driver circuitry is of conventional design and is shown as a single transistor circuitry 84. The output from transistor 84 is electrically coupled to another transistor circuitry 85 in the main output amplifier block 74. Also electrically coupled to the collector of transistor 84 is the base of transistor 89 which is of conventional design and the circuitry is designated as auxiliary driver circuitry 75. Electrically coupled to the collector of transistor 89 is the circuitry of transistor 91 designated as the auxiliary output circuitry 76. The emitter electrode of transistor circuitry 91 is coupled to the auxiliary silicon controlled rectifier electrode 53 by means of a limiting resistor 90. In the main output circuitry, block 74, the emitter of transistor 85 is electrically coupled to three limiting resistors 86, 87 and 88, respectively. These respective limiting resistors are electrically coupled to the electrodes of silicon controlled rectifiers 37, 41 and 43, respectively, by means of electrical leads 34, 35 and 36; this connection, of course, being best shown with reference to FIG. 2.

Generally, in operation, the main SCR circuit 11 either passes or blocks the alternating curent line voltage received from lines 21, 22 and 23. This action is accomplished by the control circuit 12 and the auxiliary silicon controlled rectifier circuit 13. The control circuit 12 senses the magnitude of the line voltage by rectifying the three phase voltage in rectifier circuitry 70. The magnitude of this voltage received from the supply source is coupled to non-linear amplifier which reduces to zero any hysteresis inherent in the Schmitt trigger circuitry 72. The Schmitt trigger will change states upon an excess voltage magnitude appearing at the output of the rectifier 17. This action causes the main driver 73 and main output stages to either be conducting or non-conducting, thus causing current to flow or not to flow to the silicon controlled rectifier's electrodes.

Normally, when the circuit is operating and the line voltage is below the predetermined magnitude voltage level, the control circuits via states 71, 72 73 and 74 send current to the electrode gates of silicon controlled rectifiers 37, 41 and 43, respectively, causing them to be in their fired state. This condition causes the alternating current line voltage to be passed to the load 14.

Under abnormal conditions; that is, when the three phase line voltage exceeds a predetermined value, the control circuit will sense this excess voltage to cause the Schmitt trigger circuit to change states, thus causing main driver stage 73 and main output stage 74 to stop conducting and causing the gates of the silicon controlled rectifiers 37, 41 and 43 to be cut off. At the same time, the auxiliary silicon controlled rectifier circuit is fired to immediately cut off current flow through the silicon controlled rectifiers 37, 41 and 43 and put these silicon controlled rectifiers in a blocked state. This action is necessary, since merely cutting off of the main silicon controlled rectifiers would allow current to flow to the load for a given time period. This time lapse is eliminated by use of the auxiliary silicon controlled rectifier circuit.

The main silicon controlled rectifiers 37, 41 and 43, respectively, can achieve a blocked state only if the gates are not fired and the anode current reduced to zero. After the main silicon controlled rectifiers remove current from the respective electrode gates, if may take a good portion of a cycle of alternating current for the anode current to become zero. This time would also depend on which portion of the cycle the gating current was applied and also the type of load that is present; resistive, inductive or capacitive. The prime purpose of the auxiliary circuit is to immediately reduce the anode current through the main silicon controlled rectifiers to zero. Under normal operation, the capacitors 56, 57 and 58, respectively, are charged through resistance 55 and battery 54. The resistance 55 is made large enough so that it will not sustain conduction in silicon controlled rectifiers 53 from battery 54 once the silicon controlled rectifier 53 is fired. During an abnormal conditon, the control circuit through auxiliary driver 75 and auxiliary output circuit 76 fires silicon controlled rectifier 53 at the same time as it removes gate current from the main silicon controlled rectifiers 37, 41 and 43, respectively. The discharge of capacitors 56, 57 and 58 causes cut-off of the main silicon controlled rectifiers, and silicon controlled rectifier 53 also will block for lack of sustaining current.

Even though only one silicon controlled rectifier is shown in auxiliary circuitry 13, it is to be understood that one for each phase may be desirable in some applications.

The present invention provides an effective, protective circuitry for instantaneous and automatic protection to prevent the destruction of electronic elements in the load that may be damaged by line transient voltages. The circuitry apparatus operates only during the presence of an adverse transient line conditon. When the alternating current line voltage exceeds a predetermined value, the control circuit cuts off the gates of the main silicon controlled rectifiers giving them blocking ability. At the same time, the control circuit fires the auxiliary silicon controlled rectifier circuit which immediately cuts off the current through the main silicon controlled rectifiers putting them in the blocked state. The alternating current line voltage is then blocked from the load until it becomes lower than the predetermined value.

Obviously many modifications and variations of the present invention are possible in the light of the above teachings. It is therefore to be understood that within the scope of the appended claims the invention may be practiced otherwise than as specifically described.

What is claimed is:

1. In a three phase alternating current circuitry apparatus that provides line transient protection to transistorized power supplies, comprising:
    first plurality of blocking means coupled in series between a potential source and a load, there being a blocking means in each of the three phases;
    a second lone blocking means electrically coupled in parallel circuitry arrangement with said first plurality of blocking means; and
    control circuit means for sensing overvoltage variations in the potential source and supplying an electrical signal to said first and second blocking means upon a predetermined overvoltage,
    whereby upon a predetermined overvoltage the signals from the control circuit means causes the first plurality of blocking means to be in a blocking state and the second blocking means to be in a fired state.

2. The alternating current circuit apparatus of claim 1 wherein said first blocking means, comprise:
    a silicon controlled rectifier having anode, cathode and gate electrodes;
    said anode electrically coupled to the potential source and the cathode being coupled to common; and
    a diode having anode and cathode electrodes,
    said diode coupled in parallel circuitry arrangement with said silicon controlled rectifier.

3. The alternating current apparatus of claim 2 wherein said diode has its anode coupled to the cathode of said silicon controlled rectifier.

4. The alternating current circuit apparatus of claim 1 wherein said second blocking means, comprise:
    a silicon controlled rectifier having anode, cathode and gate electrodes;
    capacitor means coupled from said anode of said silicon controlled rectifier to said first blocking means; and
    potential means parallel coupled from said anode to said cathode of said silicon controlled rectifier.

5. The alternating current circuit apparatus of claim 1 wherein said control means, comprise:
    first sensing means; and
    first and second driver means;

said first driver means coupled to said first blocking means and said second driver means coupled to said second blocking means.

6. The alternating current circuit apparatus of claim 5 wherein said first sensing means, comprises:
rectifier circuit means for providing a direct current potential;
non-linear amplifier means coupled to receive this direct current potential; and
Schmitt trigger means coupled to said non-linear amplifier means for changing states upon a predetermined variation in said direct current potential.

7. The electrical circuit apparatus of claim 5 wherein said first and second driver means are transistorized amplifier circuits.

References Cited
UNITED STATES PATENTS

| | | | |
|---|---|---|---|
| 3,147,400 | 9/1964 | McClay | 317—33 |
| 3,226,626 | 12/1965 | Moore | 307—88.5 |
| 3,231,812 | 1/1966 | Paley | 307—88.5 |
| 3,241,044 | 3/1966 | Mills | 307—88.5 |
| 3,265,952 | 8/1966 | Cutler | 307—88.5 |
| 3,270,273 | 8/1966 | Mills | 307—88.5 |
| 3,303,387 | 2/1967 | Springer | 317—31 |
| 3,319,126 | 5/1967 | Green | 317—33 |

ARTHUR GAUSS, *Primary Examiner.*

H. DIXON, *Assistant Examiner.*